(12) United States Patent
Schmidt

(10) Patent No.: US 10,503,799 B2
(45) Date of Patent: Dec. 10, 2019

(54) HYPERDATA GENERATION IN THE CLOUD

(71) Applicant: SAP SE, Walldorf (DE)

(72) Inventor: Olaf Schmidt, Walldorf (DE)

(73) Assignee: SAP SE, Walldorf ( * ) Notice: Subject to any disclaimer, the term of this patent is extended or adjusted under 35 U.S.C. 154(b) by 401 days.

(21) Appl. No.: 15/376,240

(22) Filed: Dec. 12, 2016

(65) Prior Publication Data

US 2018/0165367 A1    Jun. 14, 2018

(51) Int. Cl.
*G06F 16/907* (2019.01)
*G06F 16/9535* (2019.01)
*G06Q 50/00* (2012.01)
*G06F 16/901* (2019.01)
*G06F 16/245* (2019.01)
*G06F 16/25* (2019.01)
*G06F 16/951* (2019.01)

(52) U.S. Cl.
CPC ........ *G06F 16/9535* (2019.01); *G06F 16/245* (2019.01); *G06F 16/25* (2019.01); *G06F 16/907* (2019.01); *G06F 16/9024* (2019.01); *G06F 16/951* (2019.01); *G06Q 50/01* (2013.01)

(58) Field of Classification Search
CPC .................................................. G06F 16/907
See application file for complete search history.

(56) References Cited

U.S. PATENT DOCUMENTS

| | | | | |
|---|---|---|---|---|
| 6,735,601 | B1* | 5/2004 | Subrahmanyam | G06F 8/61 |
| 2005/0289123 | A1* | 12/2005 | Dettinger | G06F 16/951 |
| 2015/0242402 | A1* | 8/2015 | Holm | G06F 16/9024 707/733 |
| 2016/0092603 | A1* | 3/2016 | Rezaei | G06F 16/907 707/736 |
| 2016/0253364 | A1* | 9/2016 | Gomadam | G06F 16/353 707/739 |

* cited by examiner

*Primary Examiner* — Etienne P Leroux
*Assistant Examiner* — Dara J Glasser
(74) *Attorney, Agent, or Firm* — Mintz Levin Cohn Ferris Glovsky and Popeo, P.C.

(57) ABSTRACT

A system and method for building a hyperdata hub to access an enriched data model is presented. One or more data models are built based on user input to a user interface, and one or more query definitions are built based on the user input to the user interface. Data is collected from external data sources and internal data sources, and contextual data is extracted based on the collected data according to the one or more data models and the one or more query definitions. The metadata associated with the one or more data models and one or more query definitions are stored, and data is matched with the contextual data associated with the hyperdata metadata repository.

15 Claims, 4 Drawing Sheets

HYPERDATA GENERATION IN THE CLOUD

TECHNICAL FIELD

The subject matter described herein relates to hyperdata generation, and more particularly to the "harvesting" of data sources with business relevant data and to build a hyperdata hub to access an enriched data model which exposes the interrelated hyperdata.

BACKGROUND

One of the most important concepts of recent information technology is collecting data in a central repository from a number of different data sources (external data sources such as: Open data, Financial data, Social Media, Geo data, public sensors, etc.; internal data sources: Corporate portals, sensors—internet of things (IOT), on-premise systems for CRM, accounting, etc.) and analyzing the collected data much faster than was possible even a couple of years ago. The basic idea is that with all the processing power presently available, and a little creativity, researchers should be able to find novel patterns and relationships among different kinds of information.

Over the last few years this sort of analysis was generally referred to as "Big Data." Now Big Data is evolving, becoming more "hyper" and including all sorts and varieties of data sources. This "hyperdata" is a prerequisite for high level contextual services based on cognitive computing (e.g. IBM Watson®) or any other kind of data-driven application. The goal is to provide services that are founded on knowledge of a user's context to deliver personalized services based on real-time and historical data. Contextual technology can create a personalized user experience that can anticipate needs and provide intelligent recommendations and predictions.

As discussed above, hyperdata includes various forms of data from a number of sources. For example, social media serves as a fount of highly personalized content and relevant news. Almost every electronic device generates data and for decades, only a sliver of this information has been captured. Sensors in technology are becoming more important and ubiquitous, and generate huge amounts of business-relevant real-time data. Further, location-based services add an important dimension to a user's context.

Currently all applications that deal with a combination of external and internal data sources have to take care of the correct extraction of data, building a common data model and exposing the data by appropriate services. What is needed is a way to "harvest" business-relevant data from a number of various sources, and to build a hyperdata hub to access an enriched data model which exposes the interrelated hyperdata, to finally harness a vast quantity of information and to create a personalized and intelligent user experience.

SUMMARY

This document describes a system and method for creating a central hyperdata hub, which is extendable to integrate new external/internal data sources. The hyperdata hub allows for a high degree of data reuse in the context of various applications, and provides for great potential for commercialization of data services. In preferred exemplary implementations, the hyperdata hub is deployed in a cloud computing platform, such as the SAP Cloud®. Thus, the generated data access services, as well as infrastructure services can be made available to customers and external applications based on a subscription payment model.

The hyperdata hub can support the definition of complex data models by linking data from various data sources, and define custom queries on views generated for the complex data models. Further, the hyperdata hub can generate any number of services, which support Create, Read, Access and Delete (CRUD) operations, and which access the defined data models. New data based on existing data stored in any kind of data store (external data sources, internal data sources) is generated. This also includes a mapping of unstructured data to structured data (fact extraction). The newly generated data is based on a defined data model, which refers to extracted data stored in database types such as, for example, a data lake, time series database, or graph database (depending on the use case of the data model). Views are created to access the data.

New data models can be defined on-the-fly and the needed data is automatically extracted (streaming, polling) from the original location (internal, external) and stored in an appropriate database. A corresponding view is created. Each new data model does not necessarily contain only the original (extracted) data, but can also contain computed fields based on computations over several data items from different locations or on machine learning steps (which are automatically executed in the background as data comes in).

In one aspect, a system is disclosed. The system includes a user interface, and a data model builder for building one or more data models based on user input to the user interface. The system further includes a query builder for building one or more query definitions based on the user input to the user interface. The system further includes a data harvesting module for receiving and collecting data from external data sources and internal data sources, the data harvesting module having one or more data extractors for extracting contextual data based on the received and collected data according to the one or more data models and the one or more query definitions, the contextual data being determined according to metadata associated with the collected data. The system further includes a hyperdata metadata repository storing the metadata associated with the one or more data models and one or more query definitions, and a hyperdata store having a time series database, a graph database, and a data lake. The system further includes a message broker configured to match data received and collected by the data harvesting module with the contextual data associated with the hyperdata metadata repository, and to write the matched data to the hyperdata store in one or more of the time series database, the graph database, and the data lake.

In another aspect, a method is disclosed. The method includes the steps of building, by a data model builder, one or more data models based on user input to a user interface, and building, by a query builder, one or more query definitions based on the user input to the user interface. The method further includes collecting, by a data harvesting module, data from external data sources and internal data sources. The method further includes extracting, by one or more data extractors of the data harvesting module, contextual data based on the collected data according to the one or more data models and the one or more query definitions, the contextual data being determined according to metadata associated with the collected data. The method further includes storing, by a hyperdata metadata repository, the metadata associated with the one or more data models and one or more query definitions. The method further includes matching, by a message broker, data received and collected by the data harvesting module with the contextual data associated with the hyperdata metadata repository, and to write the matched data to a hyperdata store in one or more of a time series database, a graph database, and a data lake.

Implementations of the current subject matter can include, but are not limited to, systems and methods including one or more features as described as well as articles that comprise a tangibly embodied (e.g. non-transitory) machine-readable medium operable to cause one or more machines (e.g., computers, etc.) to result in operations described herein. Similarly, computer systems are also described that may include computer hardware (e.g. one or more processors and one or more memories coupled to the one or more processors) configured to perform one or more operations as described. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

This document describes a system and method for hyperdata generation in the cloud. Hyperdata represents data that connects pieces of related data and information coming from different sources (e.g. information systems, social media services, databases, etc.), and which enables formation of a web of data, evolving from the "data on the Web" that is not interrelated (or at least, not linked). Hyperdata is about connecting data, concepts, applications and ultimately people. Hyperdata links go beyond the simple fact of such connection, and express semantics about the kind of connection being made. Accordingly, hyperdata is a basis for context-aware services, and defines a semantic web, and is generated by a number of data-linking technologies. The hyperdata generated by the systems and methods described herein indicates data objects linked to other data objects in other data sources.

Figure 1:
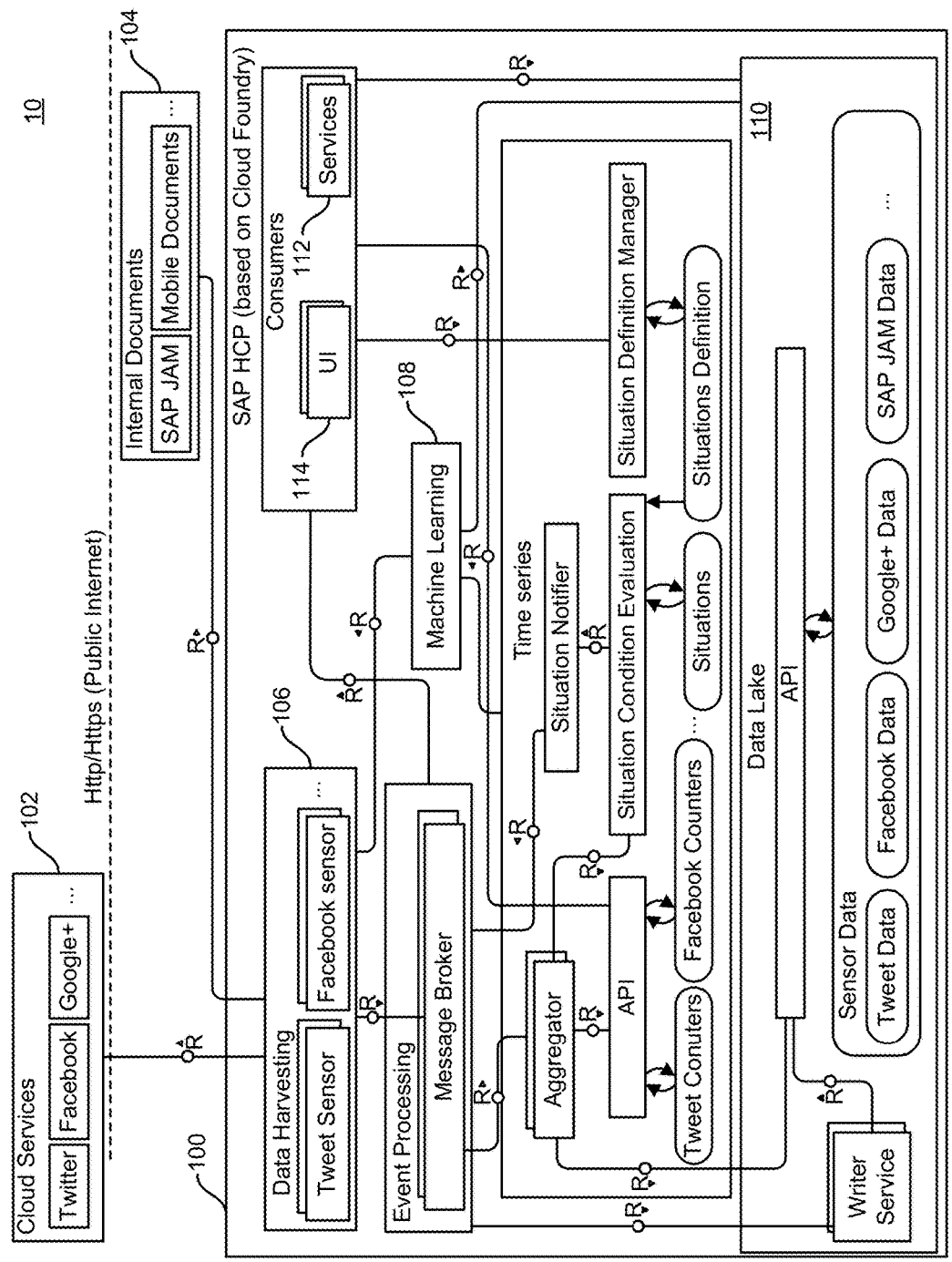
FIG. 1 illustrates a cloud based social media situation detection system, as part of an external data source for a hyperdata hub as described herein.

In particular, and as illustrated in FIG. 1, systems and methods for creating a central hyperdata hub 100 are described. FIG. 1 illustrates a system 10 for generating hyperdata linking external social media data with internal document data. The hyperdata hub 100 of a platform integrates any number of external data sources 102 and internal data sources 104, and is extendable for integrating new data sources. For example, external data sources 102 can include a number of cloud services such as social media websites accessible via public internet. Internal data sources 104 can include documents and other data stored on an enterprise's private network or on-premise data storage systems. The hyperdata hub 100 allows for a high degree of data reuse in the context of various applications, and provides for commercialization of data services. In preferred exemplary implementations, the hyperdata hub 100 is deployed in a cloud computing platform, such as the SAP Cloud®. Thus, the generated data access services and infrastructure services of the cloud computing platform can be made available to customers and external applications based on a subscription payment model, for example.

Figure 2:
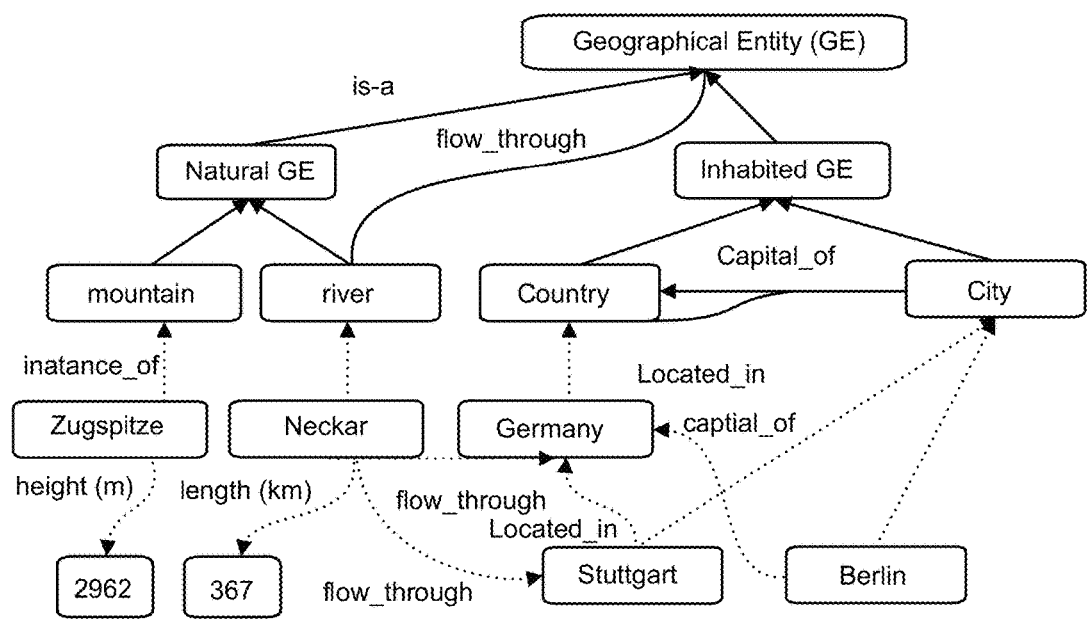
FIG. 2 illustrates an example of linked data based on an onthology, in accordance with systems and methods described herein.

The hyperdata hub 100 is configured to support the definition of data models, one simple example of which is shown in FIG. 2, by linking data from various data sources, and defining custom queries on views generated for those data models. FIG. 2 illustrates an example of a data model of linked data based on an onthology. Much more complex data models can be defined. Further, the hyperdata hub 100 can generate any number of services, which support Create, Read, Access and Delete (CRUD) operations, for example, and which can access the defined data models. The system 10 generates new data based on existing data stored in any kind of data store (external data sources, internal data sources), and creates a mapping of unstructured data to structured data via fact extraction. The newly generated data is based on a defined data model, which refers to extracted data stored in a data lake 110, a time series database, a graph database, or the like, depending on the use case of the data model. All extracted data can be persisted in the data lake 110 (e.g. based on Hadoop HDFS) and then transformed and loaded into another database type which is appropriate for the corresponding data. For instance, the social media data which reflects relationships between entities (e.g. persons) can be stored in a graph database while other data (e.g. stock prices or sensor data) can be stored in a time series database. The system can create views to improve access to the data.

New data models can be defined on-the-fly and the needed data is automatically extracted, via streaming, polling, or the like, from its original location (internal or external) by a data harvester 106 and stored in an appropriate database. In some implementations, a prerequisite is that a corresponding extractor component is available and provided by the system. For example, if a data model is defined to contain Tweet-related data, a sensor and extractor component for Twitter® Tweets is provided as part of the data harvester 106, as illustrated in FIG. 1. A custom extraction module for a corresponding internal/external data source must be implemented and registered with the platform based on the provided platform application programming interfaces (APIs). A corresponding view is created. Each new data model does not necessarily contain only the original (extracted) data, but can also contain computed fields based on computations over several data items from different locations or on machine learning steps by a machine learning module 108, which are automatically executed in the background as data is harvested. Contextual technology can create a personalized user experience that will anticipate needs and provide intelligent recommendations and predictions.

A central feature of the systems and methods described herein is an automatic service generator, for generating one or more services 112 for accessing a corresponding data model in a transparent way. Applications working with data provided by the hyperdata hub 100 do not operate on the extracted data (or the corresponding data model) directly, but use one or more of the generated services 112. Each service 112 can include a user interface 114 for providing a graphical view of an output of the service 112. This leads to better control over the data, since the generated services 112 can enforce custom access privileges, implement legal controls (e.g. some data stored in Europe should not be accessed from the US), or the like.

Access services to the hyperdata incorporate enterprise service qualities by utilizing sophisticated cloud-based technologies. This enables integration of company specific on-premise data (business data) with external data in a secure manner. Additionally, the generated services can utilize any of a number of existing technologies to optimally store and access data.

An easy configuration of new data models is based on distributed data sources by utilizing a data source catalog which allows an interactive wiring of data, where the actual data model and the corresponding access service is generated automatically.

Figure 3:
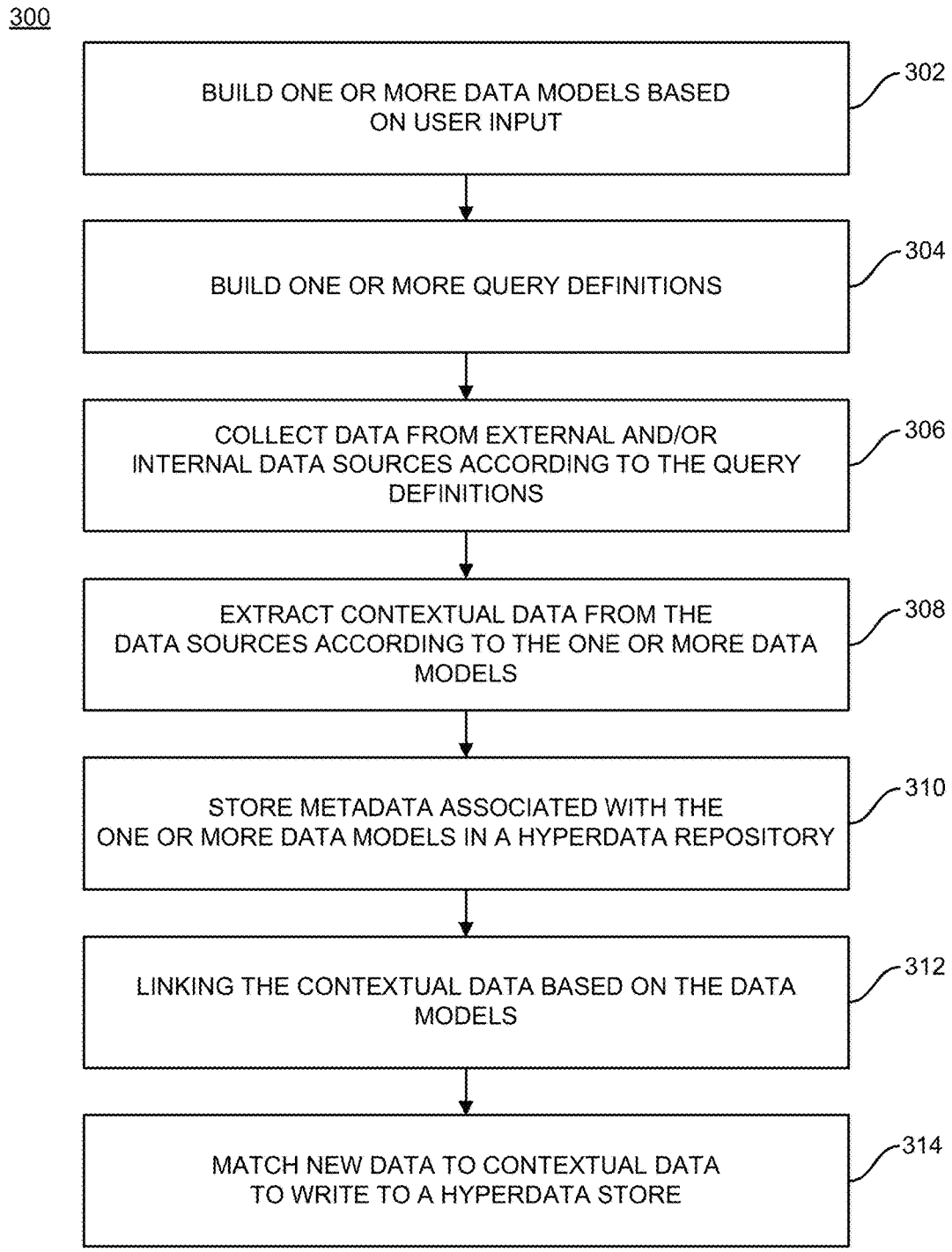
FIG. 3 is a flowchart of a method for creating a central hyperdata hub.

FIG. 3 is a flowchart of a method 300 for creating a central hyperdata hub, which is extendable to integrate new external/internal data sources. At 302 a data model builder builds one or more data models based on user input to a user interface. At 304, a query builder builds one or more query definitions based on the user input to the user interface. At 306, a data harvesting module collects data from external data sources and/or internal data sources according to the one or more query definitions of the one or more data models. At 308, one or more data extractors of the data harvesting module extract contextual data based on the collected data according to the one or more data models and the one or more query definitions, where the contextual data is determined according to metadata associated with the collected data.

At 310 a hyperdata metadata repository stores the metadata associated with the one or more data models and one or more query definitions. At 312, the contextual data can be linked together based on the data models and according to its associated metadata. At 314, a message broker matches data received and collected by the data harvesting module with the contextual data associated with the hyperdata metadata repository. The message broker can then write the matched data to a hyperdata store in one or more of a time series database, a graph database, and a data lake.

Figure 4:
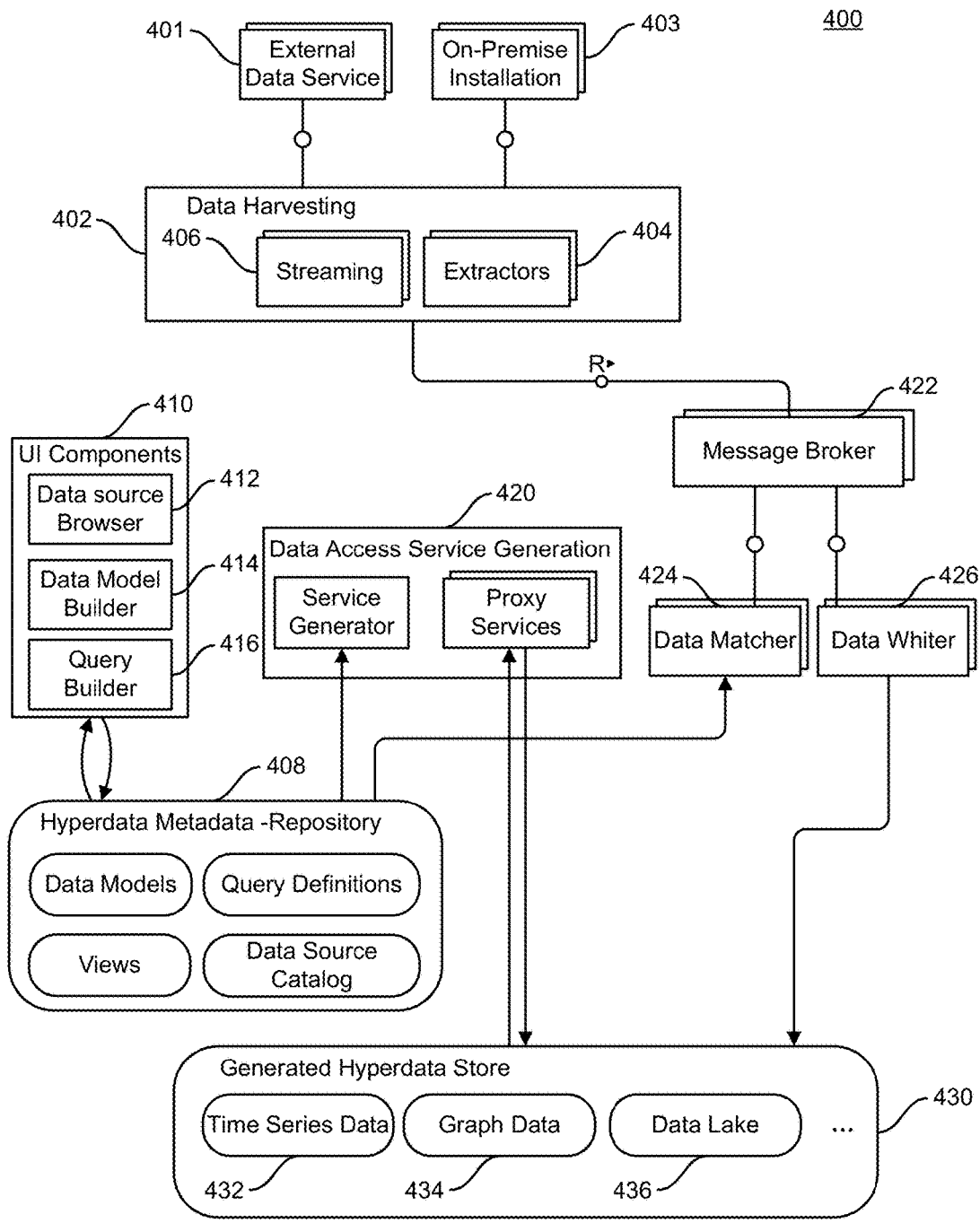
FIG. 4 is a block diagram of a system 400 for creating a central hyperdata hub for integrating external and internal data sources When practical, similar reference numbers denote similar structures, features, or elements.

FIG. 4 is a block diagram of a system 400 for creating a central hyperdata hub for integrating external and internal data sources, in accordance with implementations of the subject matter described herein. The system 400 includes a data harvesting module 402 for receiving and collecting data from both external data sources 401 and internal data sources 403, i.e. sources co-located or integrated with the on-premise installation that generate data. The data harvesting module 402 includes extractors 404 for external and private data sources based on provided APIs. The extractors 404 can include streaming modules 406 to support streaming as well as polling of data. Each extractor 404 is controlled by a scheduler, and the data harvesting module 402 includes a framework to integrate new extractors (APIs), as well as acCatalog for data sources (external/private). This catalog can be accessed via an API or UI to select supported data sources for building a "hyperdata" model.

The system 400 further includes a data model repository 408 that stores one or more models for extracted data utilized by extractors, and which defines mapping from external data to internal representation and to persistence. The system 400 also includes several UI components 410, including a data source browser 412, a data model builder 414, a query builder 416 that is connected to a query repository, which can be associated with the hyperdata metadata repository 408, which stores data models, query definitions, database views, and data source catalog(s).

A data access service generator 420 generates data services based on created data models which support defined queries (proxies/stubs for accessing data model). These data services are automatically generated and build the actual data hub and expose the data by standard protocols (e.g. OData)

The system 400 further includes a message broker 422 for high performance throughput, decouple extraction process from processing and persistence. In some implementations, the message broker 422 includes a cluster of message brokers to guarantee high availability and fault-tolerance, and to be able to deal with a high-volume of messages. The message broker 422 communicates with writer services (asynchronous writing of incoming data to storage layer—immutable data) including a data matcher 424 and a data writer 426.

Data storage for the system 400 can be implemented by any of a number of cloud-based data storage technologies, including SAP HANA, SAP Velocity, frameworks/databases: Cassandra, InfluxDB, and Hadoop due to the fact that SAP HCP is based on Cloud Foundry. The system 400 includes a generated hyperdata store 430, which includes a time series database 432, a graph database 434, and a data lake 436.

The system 400 further utilizes analytics and machine learning, such as SAP Velocity®, Spark®, etc., to detect context relevant information and automatically refine extraction plans for data harvesting to reveal interesting patterns detected automatically and schedule the extraction of additional data. Generated data access services as well as infrastructure services can be made available to customers and external applications based on a payment-model.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    a user interface;
    a data model builder configured to build one or more data models based on user input to the user interface;
    a query builder configured to build one or more query definitions based on the user input to the user interface;
    a data harvesting module configured to receive and collect data from external data sources and internal data sources according to the one or more data models and the one or more query definitions, the data harvesting module comprising one or more data extractors configured to extract contextual data based on the received and collected data according to the one or more data models and the one or more query definitions, wherein each data model includes the extracted contextual data, the contextual data being determined according to metadata associated with the collected data, wherein the one or more data extractors comprise one or more streaming modules configured to support streaming as well as polling of data, wherein the data harvesting module comprises a framework configured to integrate extractors, as well as a catalog for data sources;
    a hyperdata metadata repository configured to store the metadata associated with the one or more data models and one or more query definitions;
    a hyperdata store comprising a time series database, a graph database, and a data lake; and
    a message broker configured to match data received and collected by the data harvesting module with the contextual data associated with the hyperdata metadata repository, and to write the matched data to the hyperdata store in one or more of the time series database, the graph database, and the data lake.

2. The system in accordance with claim 1, wherein the one or more data extractors is a custom extractor associated with an external data source.

3. The system in accordance with claim 2, wherein the external data source is a social networking service.

4. The system in accordance with claim 1, wherein each data model includes computed fields based on computations over several data items from different locations.

5. A method comprising:
    building, by a data model builder, one or more data models based on user input to a user interface;
    building, by a query builder, one or more query definitions based on the user input to the user interface;
    collecting, by a data harvesting module, data from external data sources and internal data sources according to the one or more query definitions of the one or more data models;
    extracting, by one or more data extractors of the data harvesting module, contextual data based on the collected data according to the one or more data models and the one or more query definitions, the contextual data being determined according to metadata associated with the collected data, wherein each data model includes the extracted contextual data, wherein the one or more data extractors comprise one or more streaming modules configured to support streaming as well as polling of data, wherein the data harvesting module comprises a framework configured to integrate extractors, as well as a catalog for data sources;

storing, by a hyperdata metadata repository, the metadata associated with the one or more data models and one or more query definitions; and matching, by a message broker, data received and collected by the data harvesting module with the contextual data associated with the hyperdata metadata repository, and writing the matched data to a hyperdata store in one or more of a time series database, a graph database, and a data lake, the hyperdata store comprising a time series database, a graph database, and a data lake.

6. The method in accordance with claim 5, wherein the one or more data extractors is a custom extractor associated with an external data source.

7. The method in accordance with claim 6, wherein the external data source is a social networking service.

8. The method in accordance with claim 5, wherein each data model includes computed fields based on computations over several data items from different locations.

9. A computer program product comprising a non-transitory machine-readable medium storing instructions that, when executed by one or more programmable processors, cause the one or more programmable processors to perform operations comprising:

building, by a data model builder, one or more data models based on user input to a user interface;

building, by a query builder, one or more query definitions based on the user input to the user interface;

collecting, by a data harvesting module, data from external data sources and internal data sources according to the one or more query definitions of the one or more data models;

extracting, by one or more data extractors of the data harvesting module, contextual data based on the collected data according to the one or more data models and the one or more query definitions, the contextual data being determined according to metadata associated with the collected data, wherein each data model includes the extracted contextual data, wherein the one or more data extractors comprise one or more streaming modules configured to support streaming as well as polling of data, wherein the data harvesting module comprises a framework configured to integrate extractors, as well as a catalog for data sources;

storing, by a hyperdata metadata repository, the metadata associated with the one or more data models and one or more query definitions; and matching, by a message broker, data received and collected by the data harvesting module with the contextual data associated with the hyperdata metadata repository, and writing the matched data to a hyperdata store in one or more of a time series database, a graph database, and a data lake, the hyperdata store comprising a time series database, a graph database, and a data lake.

10. The computer program product in accordance with claim 9, wherein the one or more data extractors is a custom extractor associated with an external data source.

11. The computer program product in accordance with claim 10, wherein the external data source is a social networking service.

12. The computer program product in accordance with claim 9, wherein each data model includes computed fields based on computations over several data items from different locations.

13. The system of claim 1, further comprising:

a service generator configured to automatically generate data services based on built one or more data models which support the one or more query definitions.

14. The system of claim 1, wherein the message broker includes a cluster of message brokers configured to provide availability and fault tolerance, wherein the message broker is configured to communicate with a writer service configured to provide asynchronous writing of incoming data to a storage layer.

15. The system of claim 1, wherein the query builder is connected to a query repository associated with the hyperdata metadata repository.

* * * * *